US007836436B2

(12) United States Patent
Ringseth et al.

(10) Patent No.: US 7,836,436 B2
(45) Date of Patent: *Nov. 16, 2010

(54) TRANSFORMATION OF AN ASYNCHRONOUS TRANSACTIONAL MESSAGING LANGUAGE INTO A WEB SERVICES COMPATIBLE LANGUAGE

(75) Inventors: Paul F Ringseth, Redmond, WA (US); Donald James McCrady, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1060 days.

This patent is subject to a terminal disclaimer.

(21) Appl. No.: 11/546,034

(22) Filed: Oct. 10, 2006

(65) Prior Publication Data

US 2007/0033580 A1 Feb. 8, 2007

Related U.S. Application Data

(63) Continuation of application No. 10/459,021, filed on Jun. 11, 2003, now Pat. No. 7,194,733.

(51) Int. Cl.
*G06F 9/45* (2006.01)
*G06F 9/445* (2006.01)

(52) U.S. Cl. .................. 717/136; 717/140; 717/144

(58) Field of Classification Search .......... 717/136–148
See application file for complete search history.

(56) References Cited

U.S. PATENT DOCUMENTS

| 5,386,570 | A | * | 1/1995 | Lindhorst | 717/146 |
|---|---|---|---|---|---|
| 6,182,281 | B1 | | 1/2001 | Nackman et al. | 717/5 |
| 6,292,932 | B1 | * | 9/2001 | Baisley et al. | 717/114 |
| 6,446,192 | B1 | | 9/2002 | Narasimhan et al. | 712/29 |
| 6,457,066 | B1 | | 9/2002 | Mein et al. | 709/330 |
| 6,529,932 | B1 | | 3/2003 | Dadiomov et al. | 709/101 |
| 6,678,885 | B2 | * | 1/2004 | Dzeng et al. | 717/147 |
| 6,715,141 | B1 | | 3/2004 | Hodge | 717/139 |
| 6,779,177 | B1 | | 8/2004 | Bahrs et al. | 717/173 |
| 6,782,542 | B1 | | 8/2004 | Mein et al. | 719/330 |
| 6,882,996 | B2 | | 4/2005 | Preisig et al. | 707/4 |
| 6,898,618 | B1 | | 5/2005 | Slaughter et al. | 709/203 |

(Continued)

OTHER PUBLICATIONS

Govindaraju et al, "Toward characterizing the perfromance of SOAP toolkits", IEEE GRID, pp. 1-8, 2004.*

(Continued)

*Primary Examiner*—Anil Khatri
(74) *Attorney, Agent, or Firm*—Woodcock Washburn LLP

(57) ABSTRACT

Instructions in an asynchronous transactional messaging language are transformed into instructions that are compatible with the web services. In one embodiment, the asynchronous transactional messaging language is XLANG/s, and the web service languages are the web services description language (WSDL) and the simple object access protocol (SOAP). A programmer simply writes high level declarative statements that pertain to the specific type of business transaction. During compilation, selected instructions are transformed into instructions that are compatible with web services. This transformation is transparent to the designer of the business application. The asynchronous transactional messaging language source files are compiled in an iterative compilation process. During each pass of this compilation process, different variables are parsed. The parsed results are logically organized in a tree structure. The tree structure is traversed in depth first traversal order. During this traversal, instructions are transformed into instructions compatible with web services.

34 Claims, 5 Drawing Sheets

U.S. PATENT DOCUMENTS

| | | | |
|---|---|---|---|
| 6,901,588 B1* | 5/2005 | Krapf et al. | 717/164 |
| 6,928,640 B2* | 8/2005 | Schlussman | 717/137 |
| 6,948,156 B2 | 9/2005 | Sokolov | 717/136 |
| 6,986,121 B1 | 1/2006 | Boshier et al. | 717/108 |
| 7,013,290 B2 | 3/2006 | Ananian | 705/27 |
| 7,028,306 B2* | 4/2006 | Boloker et al. | 719/310 |
| 7,065,750 B2 | 6/2006 | Babaian et al. | 717/136 |
| 7,103,627 B2 | 9/2006 | Kittredge et al. | 709/201 |
| 7,194,733 B2* | 3/2007 | Ringseth et al. | 717/136 |
| 7,210,135 B2* | 4/2007 | McCrady et al. | 717/140 |
| 7,260,816 B2* | 8/2007 | Kar et al. | 717/136 |
| 7,284,240 B1* | 10/2007 | Fleegal | 717/137 |
| 7,401,325 B2* | 7/2008 | Backhouse et al. | 717/136 |
| 7,426,721 B1* | 9/2008 | Saulpaugh et al. | 717/144 |
| 7,444,644 B1* | 10/2008 | Slaughter et al. | 719/315 |
| 7,496,906 B2* | 2/2009 | Black-Ziegelbein et al. | 717/145 |
| 7,516,447 B2* | 4/2009 | Marvin et al. | 717/140 |
| 7,539,982 B2* | 5/2009 | Stuart | 717/140 |
| 7,562,352 B2* | 7/2009 | Yamada et al. | 717/136 |
| 7,565,647 B2* | 7/2009 | Davidov et al. | 717/140 |
| 7,620,943 B1* | 11/2009 | Garthwaite | 717/140 |
| 7,631,291 B2* | 12/2009 | Shukla et al. | 717/107 |
| 7,665,073 B2* | 2/2010 | Meijer et al. | 717/140 |
| 7,698,694 B2* | 4/2010 | Tjong et al. | 717/143 |
| 7,707,561 B2* | 4/2010 | Vera | 717/136 |

OTHER PUBLICATIONS

Overeinder et al, "Web service access management for integration with agent system", ACM SAC, pp. 1854-1860, 2008.*

Kelly et al, "A simplified approach to web service devlopment", ACM ACSW, pp. 1-10, 2006.*

Ma et al, "Inferring aliasing and encapsulation properties for Java", ACM OOPSLA, pp. 423-440, 2007.*

Andrews, T. et al., "Business Process Execution Language for Web Services", *BEA Systems, International Business Machines Corporation, Microsoft © Corporation, SAP AG, Siebel Systems*, Mar. 31, 2003, http://msdn.microsoft.com, 85 pages.

Box, D. et al., "Simple Object Access Protocol (SOAP) 1.1", *DevelopMentor, International Business Machines Corporation, Lotus Development Corporation, Microsoft ©, UserLand Software*, May 8, 2000, http://www.w3.org/TR/SOAP, 35 pages.

Christensen, E. et al., Web Services Description Language (WSDL) 1.1, *Ariba, International Business Machines Corporation, Microsoft ©*, Jan. 2001, http://magnet/wsdl/wsdl_1.1.htm, 45 pages.

Curbera, F. et al., "Unraveling the Web Services Web: An Introduction to SOAP, WSDL, and UDDI", *IEEE Internet Computing*, 2002, 6(2), 86-93.

Lee, C. et al., "Soap Message Structures for Web-Based Distributed Control Systems", *Proceedings of IFAC New Technologies for Computer Control*, 2001, 71-76.

Thatte, S., "XLANG-Web Services for Business Process Design", *Microsoft © Corporation*, 2001, 46 pages.

XSL Transformations (XSLT) Version 1.0, *W3C®*, Nov. 16, 1999, www.w3.org/TR/xslt, 102 pages.

XML Path Language (XPath) 2.0, W3C®, May 2, 2003, www.w3.org/TR/xpath20, 205 pages.

XLANG/S-Language Specification, Version 0.55, *Microsoft © Corporation*, 1999-2002, 146 pages.

Cridlig, et al., "XBGP MAN and XML Management Architecture for BGP", *International Journal of Network Management*, 2006, 16, 295-309.

Harris, et al., "Lightweight Object Oriented Shared Variables for Distributed Applications on the Internet", *ACM OOOPSLA*, 1998, 296-309.

Pratikakis, et al., "Transparent Proxies for Java Futures", *ACM OOPSLA*, 2004, 206-223.

Zhang, et al., A SOAP Oriented Component Based Framework Supporting Device Independent Multimedia Web Services, *IEEE Web MSE*, 2002, 40-47.

* cited by examiner

US 7,836,436 B2

TRANSFORMATION OF AN ASYNCHRONOUS TRANSACTIONAL MESSAGING LANGUAGE INTO A WEB SERVICES COMPATIBLE LANGUAGE

CROSS REFERENCE TO RELATED APPLICATIONS

This application is a continuation of U.S. application Ser. No. 10/459,021, filed Jun. 11, 2003 now U.S. Pat. No. 7,194,733, entitled "TRANSFORMATION OF AN ASYNCHRONOUS TRANSACTIONAL MESSAGING LANGUAGE INTO A WEB SERVICES COMPATIBLE LANGUAGE," which is hereby incorporated by reference in its entirety.

FIELD OF THE INVENTION

The present invention relates generally to transforming instruction sets in one language to compatible instruction sets in another language, and more specifically relates to mapping simple object access protocol (SOAP) messages with the business process language XLANG/s.

BACKGROUND OF THE INVENTION

A challenge faced by many Web sites is the provision of dynamic content, i.e., content that changes in real-time. This requires applications to be run from Web servers and transported via an appropriate protocol. A dynamic web content model allows World Wide Web (WWW) content providers to provide web services, such as interactive business applications, rather than merely publishing pages of static information.

Web services are used by businesses to interact via distributed environments, such as the Internet or WWW. To ensure that these interactions are accomplished successfully, transport mechanisms must be in place for carrying messages to and from participants, and specific business applications must be in place at each participants end. These interactions, by their very nature are message driven. For example, a buyer sends a purchase order to a seller. The seller then checks its inventory to determine if it can provide the ordered items. The seller then sends an acknowledgement back to the buyer with a price. Finally, the buyer accepts or rejects the sellers offer (and possibly places another order). As evident in this example, each participant's business application reacts to the receipt of messages, which may be received at any time. Thus, a participant's business application should be able to receive, and send, messages to conduct business transactions in an asynchronous manner. To successfully conduct a business transaction, a participant's asynchronous transactional messaging business application should be able to communicate with another participant's asynchronous transactional messaging business application via the transport mechanism. Also, each asynchronous transactional messaging business application should be able to communicate with the transport mechanism, while complying with the transport mechanism's protocol.

However, all transport mechanisms are not compatible with all business applications. A possible solution to force compatibility is to require each participant to write its asynchronous transactional messaging business application using instructions that are specifically tailored to comply with every protocol requirement of the transport mechanism. This is difficult, if not impossible for every situation. A participant would have to know the exact requirements of the protocol of the mechanism to be used. This is not always known in advance. Also, it would be extremely difficult and time consuming to program an asynchronous transactional messaging business application to address every protocol requirement. This level of difficulty would deter potential participants from using that business application. In order for businesses to use web services, the web services should be user friendly. That is, complex, intricate programming steps should be transparent to the participant. The participant should be able to generate high level business applications utilizing nomenclature and concepts familiar to the participant and normally used in the specific business.

Therefore, techniques for providing compatibility between asynchronous transactional messaging applications and web services that are transparent to the participant are desired.

SUMMARY OF THE INVENTION

The present invention provides compatibility between web services and asynchronous transactional messaging languages. Instructions in an asynchronous transactional messaging language, are mapped, or transformed, into instructions that are compatible with the web services. In one embodiment, the asynchronous transactional messaging language is XLANG/s, and the web service languages are the web services description language (WSDL) and the simple object access protocol (SOAP). A designer, or programmer simply writes high level declarative statements, in XLANG/s for example, that pertain to the specific type of business transaction. During compilation, selected instructions are transformed into instructions that are compatible with web services, such as SOAP or WSDL for example. This transformation is transparent to the designer of the business application. The transformation process transforms the type of instruction and the syntax of the instruction. Proxy classes, which refer to the class or interface name of the message, are transformed into port types. A port is a construct from which messages can be received or sent, and a port type defines a collection of operations that can be used on a port type. Methods of a proxy class are transformed into operations. An operation defines a single valid exchange that can occur on a port type. The input and output parameters of the operations (viz., methods) are transformed into request message types and response message types, respectively. The XLANG/s source files are compiled in an iterative compilation process. During each pass of this compilation process, different XLANG/s types and variables are parsed. These parsed results are logically organized in a tree structure. The tree structure is traversed in depth first traversal order. During this traversal, the XLANG/s constructs are transformed into instructions compatible with web services, such as WSDL/SOAP.

BRIEF DESCRIPTION OF THE DRAWINGS

The features and advantages of the present invention will be best understood when considering the following description in conjunction with the accompanying drawings, of which.

DETAILED DESCRIPTION OF ILLUSTRATIVE EMBODIMENTS

Figure 1:
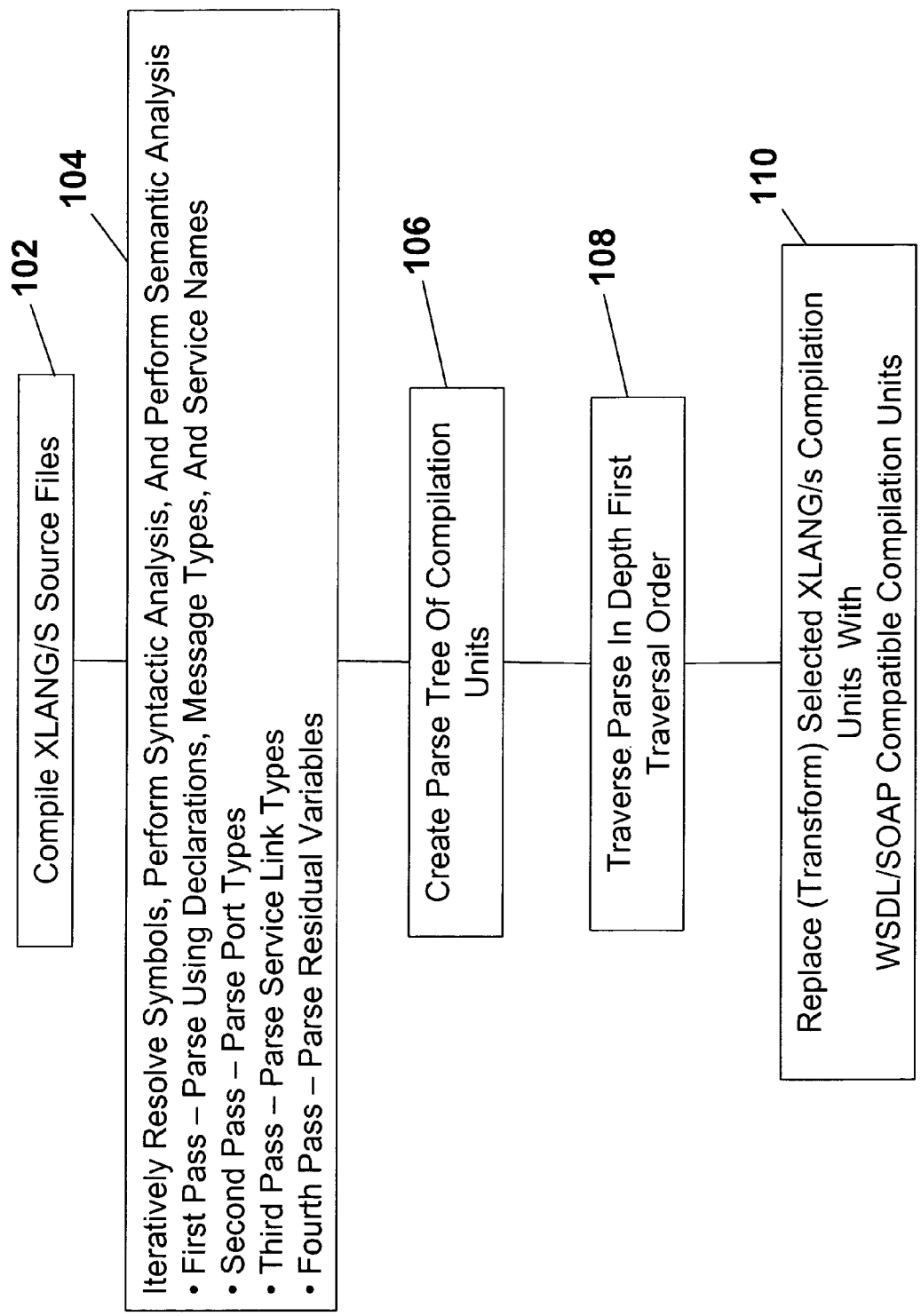
FIG. 1 is an exemplary flow diagram of a process for compiling instructions in an asynchronous transactional messaging language, in accordance with an exemplary embodiment of the present invention.

A technique in accordance with the present invention makes web services compatible with asynchronous transactional messaging languages. In one embodiment, instructions in the asynchronous transactional messaging language, XLANG/s are mapped, or transformed, into instructions that are compatible with the web services description language (WSDL) and simple object access protocol (SOAP) messages. As described in more detail below, proxy classes are transformed into port types, methods of the proxy classes are transformed into operations, and the input and output parameters of the operations are transformed into request message types and response message types, respectively. This is accomplished by compiling the XLANG/s source files in an iterative compilation process. During each pass of this compilation process, different XLANG/s variables are parsed. The compilation results in compilation units. These units are logically organized in a tree structure. The tree structure is traversed in depth first traversal order. As units are encountered during this traversal, the XLANG/s compilation units are replaced with compatible WSDL/SOAP compilation units. Throughout this document, the terms transform, translate, and map are used interchangeably. To facilitate an understanding of this translation process, a brief introduction to web services, SOAP, and the XLANG/s language are provided below.

Introduction to Web Services

Businesses, today more then ever, are interacting via distributed environments, such as the Internet or World Wide Web. For example, a user may want to know the prices of rental cars for an upcoming trip. The user may request these prices through an intermediate business on the Internet. The intermediate business, upon receiving the user's request, will send requests to a variety of rental car businesses. After responses are received, the intermediate business will then send the results to the user. The user will then reserve a car and pay for the reservation via the intermediate business. Web services are utilized to facilitate these types of interactions. Web services include, among other things, communication protocols to facilitate communication between different businesses on the network. One such protocol is the simple object access protocol (SOAP), which is described in more detail below. Also, businesses do not always use the same application software to conduct their activities. A language designed to automate business processes based on web services is XLANG/s, which is also described in more detail below. However, in order for a web service to be effective, protocols, such as SOAP, and business process languages, such as XLANG/s, must be able to communicate with each other. Establishing this compatibility is an application of an embodiment of the present invention.

Introduction to Soap

SOAP is a protocol for exchange of information in a distributed environment (e.g., the Internet). Information is exchanged via SOAP "messages". SOAP may be envisioned as a Remote Procedure Call (RPC) protocol that uses HTTP as its transport and XML as its data format, or packaging. It is to be understood, however, that neither SOAP, nor the syntax for specifying SOAP-based Web Services described herein are limited to HTTP as a transport. SOAP is described in U.S. Pat. No. 6,457,066, issued to Mein et al., and in a document entitled "Simple Object Access Protocol (SOAP) 1.1", a W3C note of May 8, 2000, authored by DevelopMentor, IBM, Lotus Development Corporation, Microsoft, and User Land Software, both of which are hereby incorporated by reference in their entirety as if presented herein.

SOAP is a protocol capable of accessing and invoking methods in Automation objects across the Internet and through firewalls. The protocol includes a data structure which encodes, as a SOAP request, the name of the Automation object of interest, a method to invoke that object, any valid Automation (in)(out) parameters to be exchanged with the object, and creates a client-side SOAP proxy for the Automation object.

A SOAP message is an XML document with predefined elements that may have user-defined data as sub-elements. The predefined elements include a mandatory SOAP envelope, an optional SOAP header, and a mandatory SOAP body. The envelope is the top element of the XML document representing the message. The header is a generic mechanism for adding features to a SOAP message. The body contains mandatory information intended for the ultimate recipient of the message. An example format of a SOAP message is shown below in Table 1.

TABLE 1

```
<Envelope xmlns="http://schemas.xmlsoap.org/soap/envelope/">
    <Header>
        <!-- user data -->
    </Header>
    <Body>
        <!-- user data -->
    </Body>
</Envelope>
```

An example of a typical "Hello World"-style HTTP SOAP request is described below. In this example, an input string is provided as an input and the output is in the form of "Hello 'input string'". Consider the function: string HelloWorld (string inputstring). This is a function named "HelloWorld" that takes a string parameter as input and returns a string. This example shows a typical scenario for which this function can be invoked remotely via SOAP and HTTP. The format of this exemplary "Hello World" SOAP HTTP request is shown in Table 2 below:

TABLE 2

```
POST /HelloWorld HTTP/1.1
Host: <someserver>
Content-Type: text/xml
Content-Length: nnnn
SOAPAction: "Some-URI"
<Envelope
    xmlns="http://schemas.xmlsoap.org/soap/envelope/">
    <Body>
```

TABLE 2-continued

```
<HelloWorld xmlns="Some-URI">
    <inputString>StringValue</inputString>
</HelloWorld>
</Body>
</Envelope>
```

The first part of the request contains common HTTP headers, with the addition of the HTTP SOAP request-specific SOAPAction header. The SOAP message portion follows the format described above (note the absence of the "Header" element). The user data under the "Body" attribute is one possible encoding of a "Hello World" RPC request. The element "inputString" is a parameter to the function "HelloWorld" and has the value "StringValue".

When a server receives this message, it:
Determines the intended recipient of the message (the "HelloWorld" function);
Parses the XML of the message;
Marshals the parameters ("inputString") into real data types (a string, in this case);
Calls the intended recipient (the "HelloWorld" function) with the expected parameters ("inputString"); and
After the function call, takes the output parameters and return value and generates a SOAP HTTP response message to send back to the client.

The format of an exemplary "Hello World" SOAP HTTP response is shown below in Table 3.

TABLE 3

```
HTTP/1.1 200 OK
Content-Type: text/xml
Content-Length: nnnn
<Envelope xmlns="http://schemas.xmlsoap.org/soap/envelope/">
    <Body>
        <HelloWorldResponse xmlns="Some-URI">
            <return>Hello StringValue</return>
        </HelloWorldResponse>
    </Body>
</Envelope>
```

Introduction to XLANG/s

XLANG/s is a language that describes the logical sequencing of business processes, as well as the implementation of the business process by using various technology components or services. The XLANG/s language is expressed in Extensible Markup Language (XML). The XLANG/s Language is a modern, special purpose language used to describe business process and business protocol. It is a declarative language, and as such it defines an explicit instruction set describing and implementing steps in a business process, the relationship between those steps, their semantics, and interactions. XLANG/s code is designed to be executable, not just descriptive. Because of its declarative nature and specific semantics, the resulting executable code is deterministic; that is, the behavior of the running business process is well defined by the semantics of the collection of XLANG/s instructions. The definitions of these business processes in executable form are called orchestrations.

XLANG/s is compatible with many internet standards. XLANG/s is designed to use XML (Extensible Markup Language), XSD (XML Schema Definition), XSLT (XSL Transformations), XPATH (XML Path Language), and WSDL (Web Services Description Language) as supported standards and has embedded support for working with .NET based objects and messages. The XLANG/s language is syntactically similar to C# to facilitate learning and understanding XLANG/s. The use of XLANG/s is most advantageous when applied to a business process. Lower level implementation of that process, such as database access, may be more appropriately performed through .NET based objects. Because XLANG/s assignment and expression syntax is modeled after C#, a C# specification may be referenced as an aid to understanding the exact syntax.

The XLANG/s language defines a rich set of high-level constructs used to define business process. While providing support for low-level data types like string and int, high-level data-types are also defined. These high-level data types include messages, ports (locations to which messages are sent and received), correlations, and service links. These data-types are used to rigorously define the semantics associated with the business process. These data-types are complemented by process control statements such as 'if/else if/else', 'while', and 'scope' (including transactional scopes, for both long-running and atomic transactions).

XLANG/s statements generally fall into one of two categories: simple statements that act on their own, such as receive or send; and complex statements which contain or group either simple statements or other complex statements. Complex statements include service, scope, parallel, and listen.

The semantics embodied in XLANG/s are a reflection of those defined in a document titled "Business Process Execution Language for Web Services", Version 1.1, dated Mar. 31, 2003, published by Microsoft, IBM, and BEA for the definition of Business Process semantics, which is hereby incorporated by reference in its entirety as if presented herein. The Business Process Execution Language for Web Services specification is commonly referred to as the BPEL4WS specification.

A relatively simple XLANG/s program requires a port type and a message type to be defined (this gives the orchestration some data to work with), receives the message over a port and then terminates. Table 4 below contains an example of XLANG/s source code for a simple "Hello World" program.

TABLE 4

```
module HelloWorldApp
{ private porttype ptPOReceive
    {
        oneway opPOReceive
        {
            HelloWorldApp.PurchaseOrder
        };
    };
    private service HelloWorld
    {
        port implements HelloWorldApp.ptPOReceive poPOReceive;
        message HelloWorldApp.PurchaseOrder msgPO;
        body ( )
        {
            receive (poPOReceive.opPOReceive, msgPO);
        }
    }
}
```

An XLANG/s program consists of one or more modules. Modules are used to organize services and XLANG/s types into hierarchical structures. All types (porttypes, correlationtypes, servicelinktypes and messagetypes) and services used in the program are members of a unique module.

A port is a construct to which XLANG/s can send message or from which XLANG/s can receive messages. The port has a defined type called porttype. The porttype construct defines a collection of operations that can be used on the porttype. These operations define a single valid message exchange over the port. Note, there may be several message exchanges. In defining porttype, messagetypes, servicelinktypes, and/or correlationtypes, a complex data type definition is created, in which notions embodied in the data type are abstracted to a higher level, allowing for the relatively easy reuse of the datatype.

The ptPOReceive port type in the HelloWorldApp module is defined as having a one way receive port operation opPOReceive, with messagetype PurchaseOrder.

The service HelloWorld block defines the actual implementation of the process, and variables it may use, including port, and message variables. The first two lines of code within this block define the port variable poPOReceive, and the message msgPO respectively. All variables, unless defined with a nested scope block, are scoped to this level.

The body contains the code describing parameters to the service and the execution behavior.

The receive statement indicates that the application anticipates receiving a message, msgPO, along the poPOReceive.opPOReceive operation. (View an operation as an endpoint for a communication pipeline between services.)

The above HelloWorld application will compile, thus resulting an orchestration. However, any underlying runtime that executes this orchestration will have difficultly processing it because there is no indication how to activate the orchestration. In XLANG/s, an activation receive invokes a new instances of an orchestration. In a typical real world business application, several messages are sent to and from the XLANG/s application. In addition, many running instances of the application may exist. For example, in the above HelloWorld application, a PurchaseOrder message is processed. This single application can process several (e.g., hundreds or thousands) of purchase orders concurrently. Preferably, a runtime implementation of XLANG/s is informed when a message should create a new instance of the process. The XLANG/s implementation is informed via an activation receive. Activation receives invoke new instances of an orchestration. However, if the message is to be routed to an existing instance, preferably the runtime implementation of XLANG/s is informed via a correlation set. Correlation sets define how a message is routed to an existing instance.

Shown below in Table 5 is example XLANG/s source code of the HelloWorld application, in which the receive statement is now an activation receive. Also, a send port is added, and the message is sent to that port.

TABLE 5

```
module HelloWorldApp
{
  private porttype ptPOReceive
  {
    oneway opPOReceive
    {
      HelloWorldApp.PurchaseOrder
    };
  };
  private porttype ptPOSend
  {
    oneway opPOSend
    {
      HelloWorldApp.PurchaseOrder
    };
  };
  private service HelloWorld
```

TABLE 5-continued

```
  {
    port implements HelloWorldApp.ptPOReceive poPOReceive;
    port uses HelloWorldApp.ptPOSend poPOSend;
    message HelloWorldApp.PurchaseOrder msgPO;
    body ( )
    {
      activate receive (poPOReceive.opPOReceive, msgPO);
      send (poPOSend.opPOSend, msgPO);
    }
  }
}
```

This version of the HelloWorld application creates a new running instance of the orchestration and sends the received message over a send port. This version of HelloWorld has the following new elements: (1) A new send port type and port: ptPOSend and poPOSend, respectively; (2) The receive statement is now an activate receive, which creates a new instance of the orchestration; and (3) A send statement which directs the message to a send port. In the two port declarations shown in the above source code, the poPOReceive uses the implements modifier, and the poPOSend uses the uses modifier. The implements modifier tells the runtime it will be receiving a message over that port. The uses modifier tells the runtime that it will be sending a message over that port.

XLANG/s understands C# (or .NET) types. However, XLANG/s categorizes .NET types into distinguished (or simple) and complex types. The distinguished types are the following classes in the System namespace (and the complex types are all other types).

| Type | Description |
|---|---|
| Boolean | Boolean value. The only valid literals are true and false. |
| Byte | Unsigned byte integer. |
| Char | Unicode character |
| Decimal | Numeric data type suitable for financial and monetary calculations, exact to the $28^{th}$ decimal place |
| Double | double precision floating point number |
| Int16 | 16 bit signed integer |
| Int32 | 32 bit signed integer |
| Int64 | 64 bit signed integer |
| SByte | Signed byte integer. |
| Single | 32 bit precision floating point |
| String | Sequence of characters |
| UInt16 | 16 bit unsigned integer |
| UInt32 | 32 bit unsigned integer |
| UInt64 | 64 bit unsigned integer |

XLANG/s reason for being (raison d'etre) is message handling. Messages can be based on schemas, .NET classes, Web Message types (WSDL), and/or complex message types. For example in the above HelloWorldApp application, the message msgPO was defined as an instance of a schema based message.

XLANG/s supports the following complex data types:

messagetype: This data type is used to define multi-part message types, data elements, XSD based messages, Method-Message types (messages that match the signature format of a method of a class or interface and are typically used to represent WSDL messagetypes), or a combination thereof.

porttype: This data type defines a collection of port operations that can be acted upon for a port instance of that type. Each operation is either asynchronous (oneway) or synchronous (requestresponse).

correlationtype (or correlation type): This data type defines the properties used in an instance of a correlation variable. Correlation data is the routing mechanism used to ensure messages moving through the system are dispatched to the appropriate running instance of a business process. For example, if a purchase order is sent to a trading partner for processing, a correlation could defines the instance of the business process corresponding to that purchase order to be invoked on its return.

servicelinktype: This data type defines the set of porttypes that form a logically consistent group of ports used in a business process. Service Links are a powerful mechanism which provides the capability to dynamically assign groups of ports at runtime. This allows a single business process to defined, that can be used to interact with multiple trading partners.

Shown below in Table 6, is source code of the HelloWorld application using XLANG/s complex data types. The initial version of the HelloWorld application contained porttypes, this revised version also contains a complex messagetype, a correlationtype for the re-transmission and receipt of a business message, and a servicelink type used to distribute the message to one of several potential partners.

TABLE 6

```
module HelloWorldApp
{
  private messagetype myMsgType
  {
    System.String strStatus;
    System.DateTime dtReceivedTime;
    body HelloWorldApp.PurchaseOrder msgPO;
  };
  private porttype ptPOReceive
  {
    oneway opPOReceive
    {
      HelloWorldApp.PurchaseOrder
    };
  };
  private porttype ptPOSend
  {
    oneway opPOSend
    {
      HelloWorldApp.PurchaseOrder
    };
  };
  private porttype ptSendToPartner
  {
    oneway Operation_1
    {
      HelloWorldApp.PurchaseOrder
    };
  };
  private porttype ptPartnerRequest
  {
    oneway opReceive
    {
      Hello WorldApp.PurchaseOrder
    };
  };
  internal porttype ptPartnerSend
  {
    oneway opSend
    {
      HelloWorldApp.PurchaseOrder
    };
  };
  private correlationtype cstSupplier
  {
    HelloWorldApp.PurchaseOrderID
  };
  private servicelinktype poServiceLinkType
  {
    poServiceLinkUsesRole
```

TABLE 6-continued

```
    {
      Hello WorldApp.ptPartnerRequest
    };
  };
  private servicelinktype rltPartnerInteraction
  {
    rlImplements
    {
      Hello WorldApp.ptPartnerRequest
    };
    rlUses
    {
      HelloWorldApp.ptPartnerSend
    };
  };
  private service HelloWorld
  {
    servicelink implements HelloWorldApp.rltPartnerInteraction.-
rlImplements rlPartnerInteraction;
    port implements HelloWorldApp.ptPOReceive poPOReceive;
    port uses HelloWorldApp.ptPOSend poPOSend;
    correlation HelloWorldApp.cstSupplier csSupplier;
    message HelloWorldApp.PurchaseOrder msgPO;
    message HelloWorldApp.myMsgType msgPO2;
    body ( )
    {
      activate receive (poPOReceive.opPOReceive, msgPO);
      construct msgPO2
      {
        msgPO2.msgPO = msgPO;
        strStatus = "Received";
        dtReceivedTime = System.DateTime.Now( );
      }
      send (rlPartnerInteraction[HelloWorldApp.ptPartnerSend].opSend,
msgPO2, initialize csSupplier);
      receive (rlPartnerInteraction[HelloWorldApp.-
ptPartnerRequest].opReceive, msgPO2);
      send (poPOSend.opPOSend, msgPO);
    }
  }
}
```

This version of the HelloWorld application has the following new artifacts:

The myMsgType messagetype. This is a complex message type consisting of a string strStatus, a timestamp dtReceived, and a body message msgPO of schema type PurchaseOrder.

The servicelinktype rltPartnerInteraction. In this sample two new actions have been inserted, sndSendToPartner and rcvReceiveFromPartner. Instead of being connected to a port as in the previous application's send and receive actions, these actions are bound through the rtlPartnerInteraction. At runtime, the ports associated with the porttypes in the service link can be dynamically assigned. In one embodiment, this is accomplished by connecting to a partner management system or database.

The correlationtype cstSupplier defines an element from the application that is used to determine how to route a return message to the appropriate running instance of an orchestration. In the HelloWorld application, the field PurchaseOrderID is used to uniquely determine how a return message from a supplier is routed to the proper orchestration instance. The correlation set is initialized upon the sending of msgPO2 to the supplier in the following statement: send (rlPartnerInteraction[HelloWorldApp.ptPartnerSend].opSend, msgPO2, initialize csSupplier).

The construct statement was also introduced in this version of the HelloWorld application. A construct statement is used to create and initialize a new message instance in an XLANG/s program. (A receive also constructs any message received. Messages must be constructed before any send.) Messages are either sent to an XLANG/s program, and hence already exist, or they are created inside of a construct block. In this HelloWorld application, msgPO2 is created and values are assigned to strStatus, dtReceived, and msgPO.

Statements

The following statements are utilized in the XLANG/s language.

- send statement. This statement is used to send a specified message to specified port.
- receive statement. This statement is used to wait upon the receipt of a specified message type along a specified port operation.
- call statement. The call statement synchronously calls from one orchestration to another orchestration. Parameters can be passed and returned.
- exec statement. The exec statement will asynchronously call from one orchestration to another. Parameters can be passed but not returned, since the calling orchestration does not wait for a return from the called orchestration.
- construct statement. The construct statement is used to create and initialize message variables. The construct statement defines a block of XLANG/s code in which a message is created and initialized. Existing messages can be sent to an XLANG/s program, but can not be created outside of a construct. A message state is known at all times, thus this mechanism provides for message distribution and rich message tracking.
- delay statement. The delay statement is used to wait until an absolute time is reached (i.e. Jan. 1, 2005) or a relative time (30 days from now).
- parallel statement. The parallel statement executes multiple braches of a business process concurrently. All branches must complete processing before any statement following the parallel is executed.
- listen statement. As with a parallel statement, the listen statement has multiple paths of execution (branches), however, the branches begins with a delay statement or a receive statement. The branch to receive first invocation is executed, and the other branches of the listen are never executed.
- while statement. The while statement repeatedly executes while its associated condition remains true.
- if statement. The if statement is used to conditionally executed one of several paths of execution, depending on the value of it associated conditions.
- scope statement. The scope statement provides a context for a block of code that defines variables and transactional semantics that apply to that block of code. Variable lifetime can be restricted to that scope. Transactional semantics, such as long-running, atomic, or none can be applied to a scope to affect its behavior.
- throw statement. The throw statement is used to explicitly invoke an exception/fault handler in the current code block.
- compensate statement. The compensate statement is used to explicitly invoke a compensation block associated with a given scope. A scope statement may have one or more compensation blocks associated with it, the compensate statement directs execution to the selected one.
- terminate—the terminate statement forcibly and irrevocably stops all processing in a schedule. A string expression associated with the terminate statement is made available to operators/administrators through appropriate logs or user interfaces.
- suspend statement. The suspend statement temporarily halts execution of a process, but can be re-started by an operator or application. A string expression associated with the terminate statement is made available to operators/administrators through appropriate logs or user interfaces.

Message Types

An XLANG/s service communicates with the outside world by sending and/or receiving messages. The message type is the structural definition of such a communication entity. Conceptually a message can be thought of as a collection of multiple strongly-typed parts. Within an XLANG/s module, the message-type can be declared as either a multi-part-type declaration or a method-type declaration. An exemplary format of a multi-part message-type definition is shown below.

```
multipart-type-declaration:
    type-modifier_opt messagetype identifier { part-declarations_opt }
type-modifier:
    public
    private
    internal
part-declarations:
    part-declaration
    part-declarations part-declaration
```

If the message-type declaration includes more than one part declaration, exactly one of the parts is annotated as a body (or identifying) part. If the message-type declaration has only one part, the body annotation is optional. In one embodiment, this is used for on-the-wire type determination, in which the type of the body part is an alias for the type of the aggregate message. An empty message-type declaration (i.e., with no parts) is allowed. Such messages are used to convey a data-free notification.

XLANG/s supports two type systems: Net and XSD. This support for dual type systems is visible in the way XLANG/s treats part declarations. A message part of type .Net type, is declared as:

```
part-declaration
    body_opt class-name identifier;
```

To natively use a .NET type as a message part, XLANG/s imposes no further restriction on it other than the fact that the type must be XML serializable using the declared type.

```
module ServiceUsingDotNetTypes
{
    using System;
    public messagetype POHeader
    {
        body String poNumber;
        Single poAmount;
```

Additionally, XLANG/s provides an extensibility mechanism whereby non XML serializable classes can be used as a message part by providing a custom formatter for the type. The runtime implementation, in such cases, uses the formatter for serialization of the object to create the wire format.

XSD-based types can be used as message parts by special casing into prescribed .NET type, which envelopes the XSD schema associated with the type. In the grammar XSD type's usage looks exactly as above, however, the underlying implementation relies on the complete definition for the XSD based type to be made available in a prescribed fashion. The part declaration itself looks like:

```
part-declaration
    body_opt class-name identifier ;
    body_opt class-name.root-element-name identifier ;
root-element-name:
    identifier
```

The first production is used when the XSD schema to which the part is pointing to is a single-rooted schema. The type of the envelope class is, then, sufficient to determine the XSD type. In case the schema being pointed to is a multi-rooted schema, the second production is necessary to point to the specific root element that is used to define the type.

```
module ServiceUsingXSDTypes
{
    using MySchemaCollection;
    public messagetype PO
    {
        body POHeader __poheader;
    };
}
```

Method-message-types are used to define a message-type based on a signature of a method call. This style is useful when targeting Web Services calls where the resulting message-types (which essentially mirror the Web Service call's parameters) can be created by the user by pointing to a web-services method. Generally, when a message-type is declared using the method as the base, one can declare two message-types from it: a request type, aggregating all the in and ref parameters; and a response type, aggregating all the out, ref parameters and (when non-void) the return value (identified by having the part-name equal to the method name concatenated with Result). It is ill-conditioned to have a parameter with the same name.

An example message type declaration is shown below.

```
method-type-declaration:
    type-modifier_opt method messagetype class-or-intf-name { method-message-type-decls } ;
type-modifier:
    public
    private
    internal
class-or-intf-name:
    class-name
    interface-name
method-message-type-decls:
    method-message-type-decl
    method-message-type-decls method-message-type-decl
method-message-type-decl:
    request-or-response method-name identifier ;
request-or-response:
    request
    response
```

Fundamentally XLANG/s understands multi-part messages. Therefore, method type declarations are transformed into a multi-part declaration. For the request type, each in & ref parameter becomes a part. For the response type, each out & ref parameter is a part. In addition the response type has another part relating to the return value when non-void.

An example of an interface definition and corresponding XLANG/s code is shown below. Assuming an interface definition as following:

```
interface IPurchaseOrderHandling
{
    [System.Web.Services.WebMethodAttribute]
    string SubmitPOHeader(string CustomerNumber,
    string CustomerAddress);
    [System.Web.Services.WebMethodAttribute]
    int SubmitLineItem(string PONumber, string Item, int Quantity);
    [System.Web.Services.WebMethodAttribute]
    [System.Runtime.Remoting.Messaging.OneWayAttribute]
    void OrderComplete (string PONumber);
}
``` its usage in XLANG/s will appear as follows:

```
module PurchaseOrderHandling
{
    public method messagetype IPurchaseOrderHandling
    {
        request SubmitPOHeader __poHeaderIn;
        response SubmitPOHeader __poHeaderOut;
        request SubmitLineItem __poLineIn;
        response SubmitLineItem __poLineOut;
        request OrderComplete __poComplete;
    }
}
```

Port Types

A port is an end point at which an XLANG/s service can send and/or receive messages. Each port is of a particular type. The porttype is a full structural definition of the shape of interactions that occur on any instance of that type. A porttype is a collection of operations.

An operation is the definition of any single valid exchange that can occur on the porttype. Direction is not specified in the porttype definition. The specific usage of the porttype (i.e., a port declaration) details the direction and consequently the usage with-in a service. Exemplary port-type and operations declarations are shown below.

```
port-type-declaration:
    attributes_opt type-modifier_opt porttype identifier {
        operation-declarations
    };
type-modifier:
    public
    private
    internal
operation-declarations:
    operation-declaration
    operation-declarations operation-declaration
```

Each operation, on the porttype, can be oneway or requestresponse in nature. An example of this is shown below.

```
operation-declaration:
    operation-type identifier { input-message-ref output-message-ref_opt fault-message-refs_opt };
operation-type:
```

-continued

```
oneway
    requestresponse
input-message-ref:
    message-type-ref
```

The operation name is unique across all operations for a specific port type. A oneway operation is associated with a single message-type, which travels as input into this operation. A on-way operation does not have an associated response. A requestresponse operation is associated with a request message type, a response message type, and (optionally) multiple faults (all individually named). Fault names are unique across a particular operation. Fault types are unique across all the fault(s) and the response type for the operation. Exemplary statements are shown below.

```
output-message-ref:
    , message-type-ref
fault-message-refs:
    , fault-message-ref
    fault-message-refs , fault-message-ref
fault-message-ref
    fault-name = message-type-ref
fault-name:
    identifier
module PurchaseOrderHandling
{
    public porttype PurchaseOrderHandling
    {
        requestresponse SubmitPOHeader {__poHeaderIn, __poHeaderOut,
poFault1 = __poHeaderFaultType1, poFault2 = __poHeaderFaultType2};
        requestresponse SubmitLineItem {__poLineIn, __poLineOut,
poLineFault1 = __poLineFaultType1};
        oneway OrderComplete {__poComplete};
    }
}
```

Class and interface names can be used for defining the shape/type of a port.

When using this syntax:
  Classes used for port-type declaration are attributed with WebServicesBindingAttribute.
  Each method on the class/interface with System.Web.Services.WebMethodAttribute (for interfaces) and System.Web.Services.Protocols.SoapDocument
    Method Attribute (for classes) on it is treated as an operation on the port-type generated from such a declaration.
  If the method has SoapDocumentMethodAttribute with property OneWay set to true, the resulting operation is oneway, otherwise it is requestresponse. This includes support for empty synchronization messages (in case e.g., the method has no ref or out parameters or non-void return). To indicate that an interface method is oneway, the attribute System.Runtime.Remoting.Messaging.OneWayAttribute is used.
  Signature of each operation is determined based on method message type declaration scheme as described above.
  Class/Interface do not have overloaded methods.

DESCRIPTION OF EXEMPLARY EMBODIMENTS

FIG. 1 is an exemplary flow diagram of a process for compiling instructions in an asynchronous transactional messaging language (e.g., XLANG/s) into instruction that are compatible with web services languages (e.g., WSDL, SOAP). All XLANG/s source files are compiled, creating a single parse tree of compilation units. This tree is traversed in depth first traversal order, transforming types, ports, and messages corresponding to Web Services in to their corresponding XLANG/s types. At step 102, XLANG/s source files are compiled, producing compilation units. During the compilation process, types and symbols are resolved, and syntactic and semantic analysis is performed, at step 104. The source files are iteratively compiled. The number of iterations is related to the level of dependency of the variable be compiled. In an exemplary embodiment, this iterative compilation is preformed in a sequence of 4 passes. For example, service variables such as ports, messages, servicelinks and correlations depend upon the XLANG/s types. Servicelinktypes, depend upon porttypes. Porttypes depend upon messagetypes. These variables are not provided to the compiler in any specific order, thus the first time a variable is encountered, the variable upon which it depends may not have been previously processed. Therefore, the compilation is performed iteratively. In the first pass the using declarations, messagetypes, correlationtypes and service names are parsed. Porttypes are parsed during the second pass. Servicelinktypes are parsed during the third pass, and everything else (residual types and variables) are parsed during the fourth pass.

At step 106, the compilation units are logically formed into a parse tree. This tree is traversed in depth first parse tree traversal order at step 108. At step 110, during the traversal, selected XLANG/s compilations units (i.e., those types, ports, and messages corresponding to Web Services) are replaced with (transformed to) WSDL/SOAP compatible compilation units. For each compilation unit, method messagetypes and class-based porttypes appearing in servicelinktypes, are transformed upon parsing the first service in the units. Then the method-based messages and class-based ports are transformed. When subsequent services are parsed, only the method-based messages and class-based ports need to be transformed.

Figure 2:
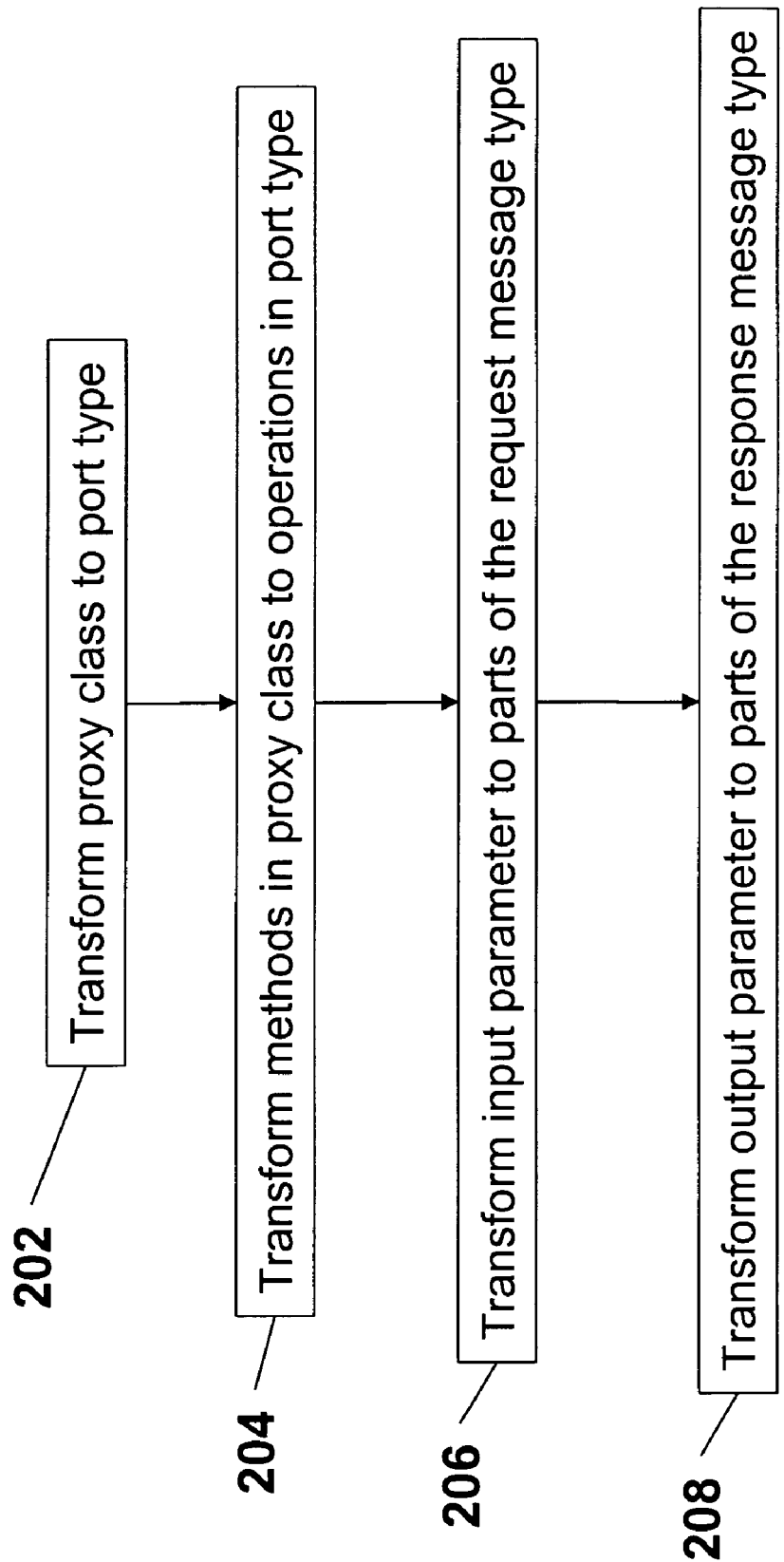
FIG. 2 is an exemplary flow diagram of a process for transforming instructions in an asynchronous transactional messaging language into instructions that are compatible with web services, in accordance with an exemplary embodiment of the present invention.

FIG. 2 is an exemplary flow diagram of a process for transforming instructions in an asynchronous transactional messaging language (e.g., XLANG/s) into instructions that are compatible with web services (e.g. WSDL, SOAP). Web Services related proxy classes are transformed to XLANG/s port types at step 202. All methods in the proxy class are transformed to XLANG/s port types at step 204. Input parameters of the operations are transformed to request XLANG/s message types at step 206. Output parameters of the operations are transformed to response XLANG/s message types at step 208. These transformations are performed in accordance with transformation syntactic rules.

Figure 3:
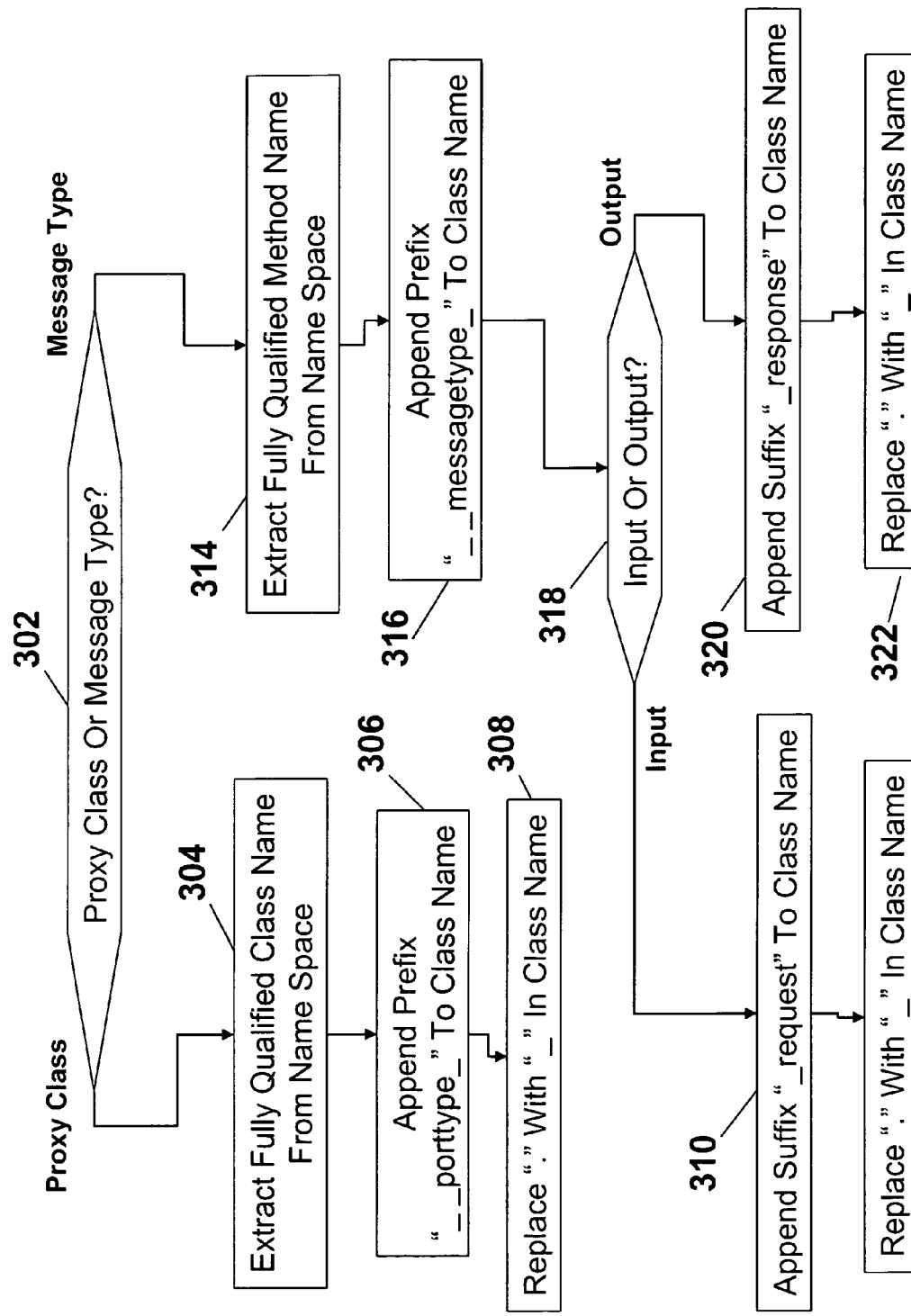
FIG. 3 is an exemplary flow diagram of a process for syntactically transforming instructions in an asynchronous transactional messaging language into instructions compatible with web services, in accordance with an exemplary embodiment of the present invention.

FIG. 3 is an exemplary flow diagram of a process for syntactically transforming instructions in an asynchronous transactional messaging language (e.g., XLANG/s) into instructions compatible with web services (e.g. WSDL, SOAP). At step 302 it is determined if the instruction to be transformed is a proxy class or a message type. If the instruction is a proxy class, then at step 304, the fully qualified class name is extracted from the name space. For example, if the name space for a WSDL proxy class is: N1.N2.N3 {public class ProxyClass {public string Xstring} (int i, double d0}}, then the fully qualified class name "N1.N2.N3.ProxyClass" is extracted. At step 306, a prefix is appended to the fully qualified call name. The prefix includes double underscores followed by the term "porttype", followed by a single underscore. Thus, using the above example, the fully qualified class name "N1.N2.N3.ProxyClass" is transformed into "___porttype_N1.N2.N3. ProxyClass". At step 308, each period is replaced with an underscore in the fully qualified class name. Thus the final version of the transformation of the above example is: "___porttype_N1_N2_N3_ProxyClass".

Returning to step 302, if the instruction is a message type, then the fully qualified method name is extracted from the name space at step 314. The prefix comprising double underscores followed by the term "messagetype", followed by a single underscore is appended to the fully qualified method name at step 316. At step 318 it is determined if the instruction includes an input parameter or an output parameter. If the instruction comprises an input parameter, then at step 310, a suffix comprising a single underscore followed by the term "request" is appended to the fully qualified method name. At step 312, all periods are replaced with underscores in the fully qualified method name. For example, if the fully qualified name for a SOAP method having a request operation is: "N1.N2.N3.ProxyClass.XBar", the transformed instruction is:

"___messagetype_N1_N2_N3_ProxyClass_XBar_request".

Returning to step 318, if it is determined that the instruction comprises an output parameter, a suffix comprising a single underscore followed by the term "response" is appended to the fully qualified method name, at step 320. At step 322, all periods are replaced with underscores in the fully qualified method name. For example, if the fully qualified name for a SOAP method having a response operation is: "N1.N2.N3.ProxyClass.XBar", the transformed instruction is:

"___messagetype_N1_N2_N3_ProxyClass_XBar_response".

A more comprehensive example illustrating syntax transformations to both port types and message types is shown in Table 7 below. Assume the following example proxy class.

TABLE 7

```
namespace localhost.WebService2 {
    public class Service1 ... {
        public string HelloWorld(string s, bool foo) {...}
    }
}
```

Utilizing the above described transformation syntax, yields the transformed names, shown in Table 8.

TABLE 8

```
__porttype__localhost__WebService2__Service1
__messagetype__localhost__WebService2__Service1__HelloWorld__request
__messagetype__localhost__WebService2__Service1__
HelloWorld__response
```

The following two examples illustrate the above described transformation processes. A programmer and/or designer writes XLANG/s code to be associated with web services. The code that is written by the programmer/designer is transformed by the processes described above to be compatible with the web services. The following examples show code that could be used on both sides of a message transaction. One side is referred to as the web services side and the other side is referred to as the client side. Also, at the beginning of each example the web services code is shown. This web services code is in the form of SOAP code.

Table 9 below contains the Hello World SOAP example described earlier.

TABLE 9

```
public interface SoapInterface {
    [System.Web.Services.WebMethodAttribute]
    string HelloWorld(string inputString);
}
public class SoapInterfaceImpl {
    public static string HelloWorld(string inputString) {
        // fairly mindless
        return "Hello " + inputString;
    }
}
```

The Web Services side XLANG/s code that implements a corresponding Web Service is shown in Table 10 below:

TABLE 10

```
module M {
    using System;
    public method messagetype SoapInterface {
        request HelloWorld mt_request;
        response HelloWorld mt_response;
    };
    public service S {
        message mt_request m_in;
        message mt_response m_out;
        port implements SoapInterface web_port;
        body {
            activate receive(web_port.HelloWorld, m_in);
            // receive message part "String m_in.inputString"
            // from a SOAP HTTP request
            construct m_out {
                // just fill m_out with the SOAP method call
                m_out.HelloWorldResult
                    =
        SoapInterfaceImpl.HelloWorld(m_in.inputString);
            }
            // send message part "String m_out.HelloWorldResult"
            // back out with a SOAP HTTP response
            send(web_port.HelloWorld, m_out);
        }
    }
}
```

A client side Web Service implemented in XLANG/s takes the form shown in Table 11 below.

TABLE 11

```
module M2 {
    using System;
    public method messagetype SoapInterface {
        request HelloWorld mt_request;
        response HelloWorld mt_response;
    };
    public service S2 {
        message mt_request m_in;
        message mt_response m_out;
        port uses SoapInterface web_port;
        body(String strIn) {
            construct m_in {
                // just fill m_in with the service input parameter
                m_in.inputString = strIn;
            }
            // send the message part "String m_in.inputString"
            // our using a SOAP HTTP solicit
            send(web_port.HelloWorld, m_in);
            // receive message part "String
    m_out.HelloWorldResult"
            // back out with a SOAP HTTP response
            receive(web_port.HelloWorld, m_out);
        }
    }
}
```

To be compatible with the SOAP code of Table 9, the XLANG/s code of Table 10 is transformed in accordance with the processes described above. The transformed XLANG/s code, transformed from the code shown in Table 10 is shown below in Table 12 below.

TABLE 12

```
module M {
  using System;
  public messagetype __SoapInterface__HelloWorld__request {
    System.String inputString;
  };
  public messagetype __SoapInterface__HelloWorld__response {
    System.String HelloWorldResult;
  };
  public porttype __porttype__SoapInterface {
    requestresponse HelloWorld {
      __SoapInterface__HelloWorld__request,
      __SoapInterface__HelloWorld__response
    };
  };
  public service S {
    message __SoapInterface__HelloWorld__request m__in;
    message __SoapInterface__HelloWorld__response m__out;
    port implements __porttype__SoapInterface web__port;
    body( ) {
      activate receive(web__port.HelloWorld, m__in);
      construct m__out {
        m__out.HelloWorldResult =
    SoapInterfaceImpl.HelloWorld(m__in.inputString);
      }
      send(web__port.HelloWorld, m__out);
    }
  }
}
```

To be compatible with the SOAP code of Table 9, the XLANG/s code of Table 11 is transformed in accordance with the processes described above. The results are shown below in Table 13.

TABLE 13

```
module M2 {
  using System;
  public messagetype __SoapInterface__HelloWorld__request {
    String inputString;
  };
  public messagetype __SoapInterface__HelloWorld__response {
    String HelloWorldResult;
  };
  public porttype __porttype__SoapInterface {
    requestresponse HelloWorld {
      __SoapInterface__HelloWorld__request,
      __SoapInterface__HelloWorld__response
    };
  };
  public service S2 {
    message __SoapInterface__HelloWorld__request m__in;
    message __SoapInterface__HelloWorld__response m__out;
    port uses __porttype__SoapInterface web__port;
    body(String strIn) {
      construct m__in {
        m__in.inputString = strIn;
      }
      send(web__port.HelloWorld, m__in);
      receive(web__port.HelloWorld, m__out);
    }
  }
}
```

The second example is slightly more sophisticated than the first example. Web Services in the form of two SOAP methods are shown below in Table 14.

TABLE 14

```
namespace NS
{
  public interface WebInterface
  {
    [System.Web.Services.WebMethodAttribute]
    int method1(double d, ref string s, out decimal dec);
    [System.Web.Services.WebMethodAttribute]
    [System.Runtime.Remoting.Messaging.OneWayAttribute]
    void method2(int[ ] ia);
  }
}
```

The XLANG/s code that would be written by a designer/programming to be associated with the code of Table 14 is shown below in Table 15.

TABLE 15

```
module M {
  using System;
  public method messagetype NS.WebInterface {
    request method1 mt1__request;
    response method1 mt1__response;
    request method2 mt2__request;
  };
  public service S {
    message mt1__request m1__in;
    message mt1__response m1__out;
    message mt2__request m2__in;
    port implements NS.WebInterface web__port;
    body {
      parallel {
        task {
          activate receive(web__port.method1, m1__in);
          // receive message part "String m1__in.s"
          // receive message part "Double m1__in.d"
          construct m1__out {
            m1__out.s = m1__in.s;
            m1__out.dec = 5M;
            m1__out.method1Result = (Int32) m1__in.d;
          }
          send(web__port.method1, m1__out);
        }
        task {
          activate receive(web__port.method2, m2__in);
          // receive message part "Int32[ ] m2__in.ia"
        }
      }
    }
  }
}
```

In order for the XLANG/s code of Table 15 to be compatible with the SOAP code of Table 14, it is transformed in accordance with the processes described above. The resultant code is shown in Table 16 below.

TABLE 16

```
module M {
  using System;
  public messagetype __NS__WebInterface__method1__request {
    System.Double d;
    System.String s;
  };
  public messagetype __NS__WebInterface__method1__response {
    System.Int32 method1Result;
    System.String s;
    System.Decimal dec;
  };
  public messagetype __NS__WebInterface__method2__request {
    System.Int32[ ] ia;
  };
  public porttype __porttype__NS__WebInterface {
```

TABLE 16-continued

```
        requestresponse method1 {
            _NS_WebInterface_method1_request,
            _NS_WebInterface_method1_response
        };
        oneway method2 {
            _NS_WebInterface_method2_request
        };
    };
    public service S {
        message _NS_WebInterface_method1_request m1_in;
        message _NS_WebInterface_method1_response m1_out;
        message _NS_WebInterface_method2_request m2_in;
        port implements _porttype_NS_WebInterface web_port;
        body( ) {
            parallel {
                task {
                    activate receive(web_port.method1, m1_in);
                    construct m1_out {
                        m1_out.s = m1_in.s;
                        m1_out.dec = 5M;
                        m1_out.method1Result = (Int32) m1_in.d;
                    }
                    send(web_port.method1, m1_out);
                }
                task {
                    activate receive(web_port.method2, m2_in);
                }
            }
        }
    }
}
```

Figure 4:
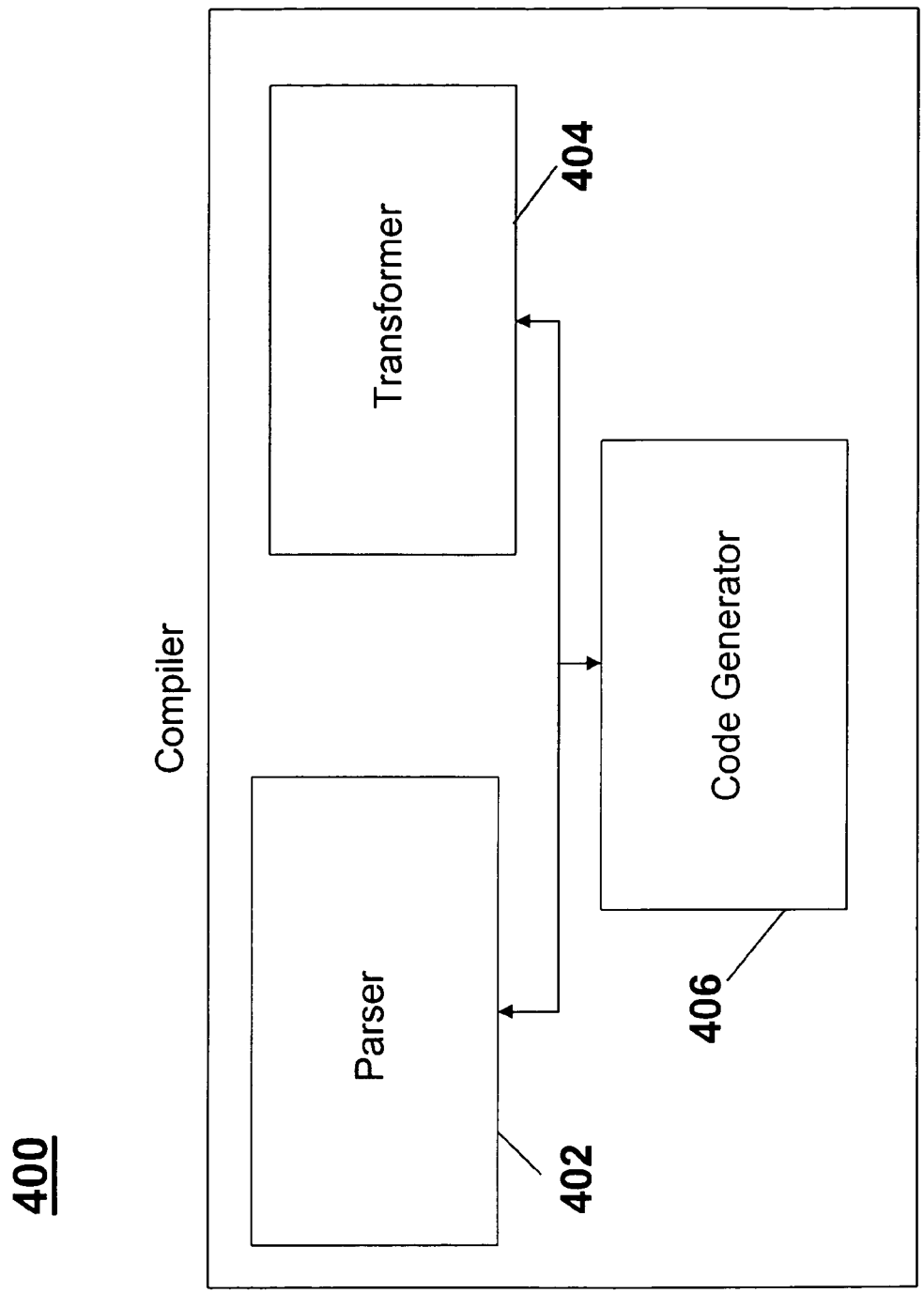
FIG. 4 is a block diagram of an exemplary compiler for transforming instructions in an asynchronous transactional messaging language into instruction compatible with web services, in accordance with an exemplary embodiment of the present invention.

FIG. 4 is a block diagram of an exemplary compiler 400 for transforming instructions in an asynchronous transactional messaging language (e.g., XLANG/s) into instruction compatible with web services (e.g., WSDL, SOAP). Generally, the compiler 400 comprises a parser 402 a transformer 404 and a code generator 406. The parser 402 parses variables during the compilation to form the parse tree described above. The transformer 404 transforms the XLANG/s instructions into instructions compatible with web services languages such as WSDL and SOAP.

More specifically, the code generator 406 analyzes the transformed parse tree from the transformer 404 and then produces an intermediate language that can be compiled into machine instructions to execute the program, or the code generator 406 can produce machine instructions directly. The parse tree is traverses in depth first traversal order. During this traversal, the transformer 404 transforms selected compilation units into corresponding instructions compatible with web services (e.g., WSDL, SOAP). These transformations are performed in accordance with the processes described above with reference to FIGS. 1, 2, and 3. The XLANG/s source files are iteratively compiled. In one embodiment, the parser 402 parses the XLANG/s files in four passes. During the first pass, the parser 402 parses using declarations, message types, correlationtypes and service names during a first pass. During the second pass, the parser 402 parses port types. During the third pass, the parser 402 parses service link types and during the fourth pass the parser 402 parses residual types and variables (everything else).

Overview of a Suitable Computing System Environment

Figure 5:
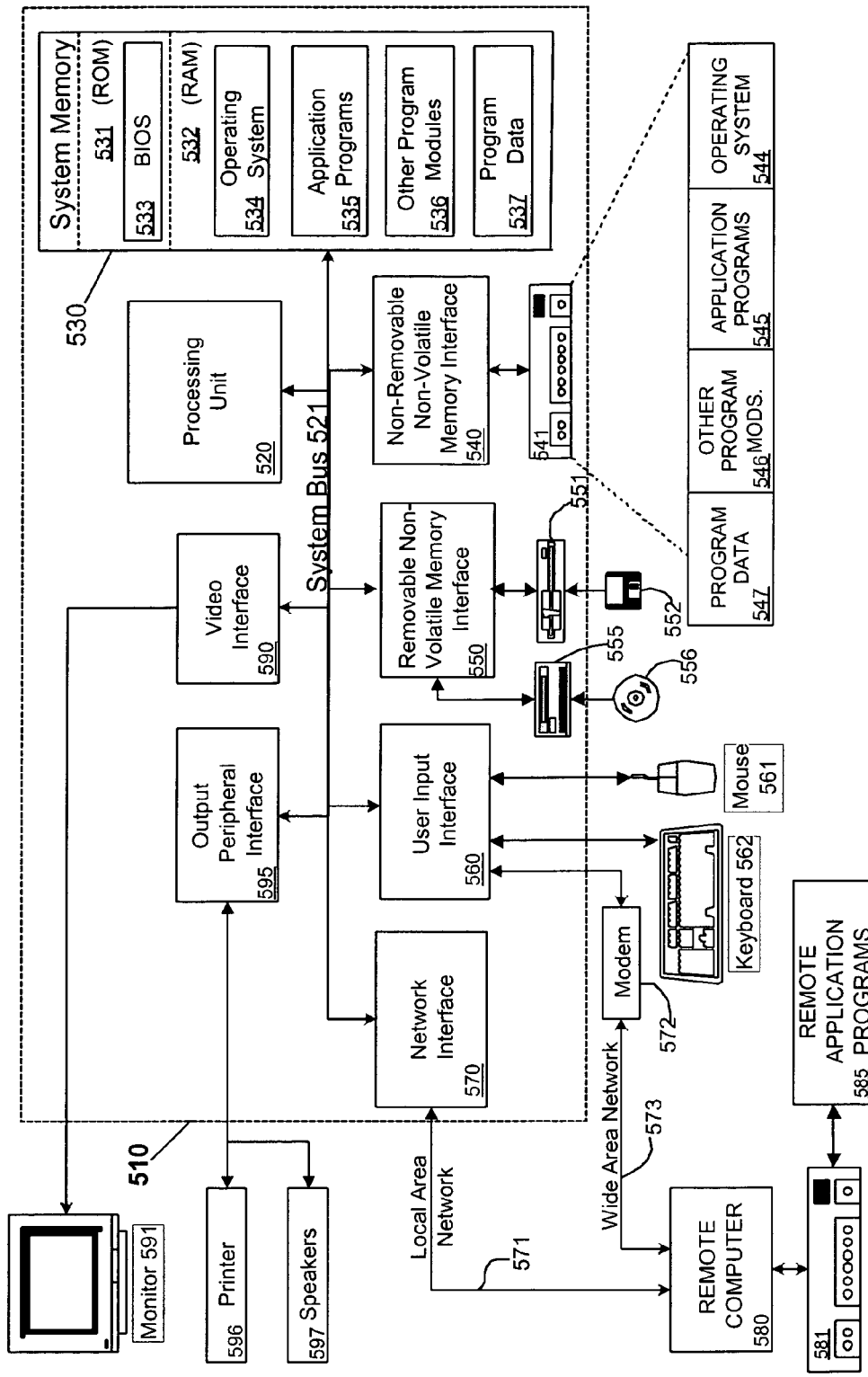
FIG. 5 illustrates an example of a suitable computing system environment in which the method and system for positional access using a btree in accordance with an exemplary of the present invention may be implemented.

FIG. 5 illustrates an example of a suitable computing system environment 500 in which the method and system for transforming SOAP messages to XLANG/s may be implemented. The computing system environment 500 is only one example of a suitable computing environment and is not intended to suggest any limitation as to the scope of use or functionality of the method and system for transforming SOAP messages to XLANG/s. Neither should the computing environment 500 be interpreted as having any dependency or requirement relating to any one or combination of components illustrated in the exemplary operating environment 500.

The method and system for transforming SOAP messages to XLANG/s are operational with numerous other general purpose or special purpose computing system environments or configurations. Examples of well known computing systems, environments, and/or configurations that may be suitable for use with the method and system for transforming SOAP messages to XLANG/s include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The method and system for transforming SOAP messages to XLANG/s may be described in the general context of computer-executable instructions, such as program modules, being executed by a computer. Generally, program modules include routines, programs, objects, components, data structures, etc. that perform particular tasks or implement particular abstract data types. The method and system for transforming SOAP messages to XLANG/s may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing the method and system transforming SOAP messages to XLANG/s includes a general purpose computing device in the form of a computer 510. Components of the computer 510 may include, but are not limited to, a processing unit 520, a system memory 530, and a system bus 521 that couples various system components including the system memory 530 to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The computer 510 typically includes a variety of computer readable media. Computer readable media can be any available media that can be accessed by computer 510 and includes both volatile and non-volatile media, removable and non-removable media. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. It is to be understood that combinations of any of the media are also included within the scope of computer readable media.

The system memory 530 includes computer storage media in the form of volatile and/or non-volatile memory such as ROM 531 and RAM 532. A basic input/output system 533 (BIOS), containing the basic routines that help to transfer information between elements within computer 510, such as during start-up, are typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/non-volatile computer storage media. By way of example only, FIG. 5 illustrates a hard disk drive 541 that reads from or writes to non-removable, non-volatile magnetic media, a magnetic disk drive 551 that reads from or writes to a removable, non-volatile magnetic disk 552, and an optical disk drive 555 that reads from or writes to a removable, non-volatile optical disk 556, such as a CD-ROM, CDRW, or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus 521, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted include a local area network (LAN) 571 and a wide area network (WAN) 573, but may also include other networks. Such networking environments are commonplace in offices, enterprise-wide computer networks, intranets and the Internet.

Then used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the method and system for transforming SOAP messages to XLANG/s may also be implemented via an operating system, application program interface (API), or a "middle man" object between a coprocessor and requesting object, such that services may be performed by, supported in, or accessed via all of .NET's languages and services, and in other distributed computing frameworks as well.

A method for transforming SOAP to XLANG/s as described herein may be embodied in the form of computer-implemented processes and system for practicing those processes. A method for transforming SOAP to XLANG/s as described herein may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by a computer, the computer becomes a system for practicing the invention. The method for transforming SOAP to XLANG/s as described herein may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes a system for practicing the invention. When implemented on a general-purpose processor, the computer program code segments configure the processor to create specific logic circuits.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While embodiments of the present invention has been described in connection with the exemplary embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

What is claimed is:

1. A computer-implemented method for transforming instructions in an asynchronous transactional messaging language to instructions compatible with web services, said method comprising:
    translating proxy class instructions of said asynchronous transactional messaging language into corresponding port type instructions compatible with said web services;
    translating methods of said proxy class instructions into corresponding operations of said port types;
    translating input parameters of said methods into corresponding request message types of said operations;
    translating output parameters of said methods into corresponding response message types of said operations;
    storing the translated output parameters for subsequent use; and
    iteratively compiling said port type instructions and said proxy class instructions a predetermined number of times, wherein said predetermined number is determined in accordance with a level of dependency of variables within said asynchronous transactional messaging language.

2. A method in accordance with claim 1, wherein said web services compatible instructions are compatible with a remote procedure call protocol.

3. A method in accordance with claim 2, wherein said remote procedure call protocol utilizes hypertext transport protocol (HTTP) as a transport and extensible markup language (XML) as a data format.

4. A method in accordance with claim 1, wherein said web services compatible instructions are compatible with a web services description language (WSDL)-like language.

5. A method in accordance with claim 1, wherein said web services compatible instructions are compatible with a simple object oriented protocol (SOAP)-like language.

6. A method in accordance with claim 1, wherein said asynchronous transactional messaging language is an XLANG/s-like language.

7. A method in accordance with claim 1, further comprising:
    extracting a fully qualified class name from a name space of said proxy class;
    appending a prefix to said fully qualified class name, said prefix comprising double underscores followed by a term "porttype" followed by a single underscore; and
    replacing all periods in said fully qualified class name with a single underscore.

8. A method in accordance with claim 1, further comprising:
    extracting a fully qualified method-type name from a name space of a method-type;

appending a prefix to said fully qualified method-type name, said prefix comprising double underscores followed by a term "messagetype" followed by a single underscore;

appending a suffix to said fully qualified method-type name, wherein:

if said method-type comprises an input parameter, said suffix comprises a single underscore followed by a term "request"; and if said method-type comprises an output parameter, said suffix comprises a single underscore followed by a term "response"; and replacing all periods in said fully qualified method-type name with a single underscore.

9. A computer-implemented method for compiling instructions in an asynchronous transactional messaging language, said method comprising:

compiling said instructions in said asynchronous transactional messaging language for providing compilation units, wherein said act of compiling comprises:

iteratively compiling said instructions a predetermined number of times; and said predetermined number is determined in accordance with a level of dependency of variables within said asynchronous transactional messaging language;

organizing said compilation units into a tree;

traversing said tree in depth first traversal order; and transforming selected encountered compilation units into corresponding second instructions compatible with web services.

10. A method in accordance with claim 9, said act of iteratively compiling comprises:

parsing using declarations, message types, correlation-types and service names during a first pass;

parsing port types during a second pass;

parsing service link types during a third pass; and parsing residual types and variables during a fourth pass.

11. A method in accordance with claim 9, wherein said act of transforming comprises transforming types, ports and messages in said asynchronous transactional messaging language into type instructions compatible with said web services.

12. A method in accordance with claim 9, wherein said act of transforming comprises:

upon encountering all types associated with a service, transforming method message types and class based port types appearing in service link types in said asynchronous transactional messaging language into corresponding types compatible with said web services; and upon encountering subsequent services, transforming method based messages and class based ports in said asynchronous transactional messaging language with types compatible with said web services.

13. A method in accordance with claim 9, wherein said second instructions are compatible with a remote procedure call protocol.

14. A method in accordance with claim 13, wherein said remote procedure call protocol utilizes hypertext transport protocol (HTTP) as a transport and extensible markup language (XML) as a data format.

15. A method in accordance with claim 9, wherein said second instructions are compatible with a web services description language (WSDL)-like language.

16. A method in accordance with claim 9, wherein said second instructions are compatible with a simple object oriented protocol (SOAP)-like language.

17. A method in accordance with claim 9, wherein said asynchronous transactional messaging language is an XLANG/s-like language.

18. A compiler for compiling instructions in an asynchronous transactional messaging language, said compiler comprising:

a code generator for:

compiling said instructions in said asynchronous transactional messaging language for providing compilation units, wherein said act of compiling comprises:

iteratively compiling said instructions a predetermined number of times; and said predetermined number is determined in accordance with a level of dependency of variables within said asynchronous transactional messaging language;

organizing said compilation units into a tree; and traversing said tree in depth first traversal order; and a transformer for transforming selected encountered compilation units into corresponding second instructions compatible with web services.

19. A compiler in accordance with claim 18, said instructions being iteratively compiled, said compiler further comprising:

a parser for:

parsing using-declarations, message types, correlation types and service names during a first pass;

parsing port types during a second pass;

parsing service link types during a third pass; and parsing residual types and variables during a fourth pass.

20. A compiler in accordance with claim 18, wherein said transformer transforms types, ports and messages in said asynchronous transactional messaging language into type instructions compatible with said web services.

21. A compiler in accordance with claim 18, wherein:

upon encountering all types associated with a service, said transformer transforms method message types and class based port types appearing in service link types in said asynchronous transactional messaging language into corresponding types compatible with said web services; and upon encountering subsequent services, said transformer transforms method based messages and class based ports in said asynchronous transactional messaging language into types compatible with said web services.

22. A compiler in accordance with claim 18, wherein said web services compatible instructions are compatible with a remote procedure call protocol.

23. A compiler in accordance with claim 22, wherein said remote procedure call protocol utilizes hypertext transport protocol (HTTP) as a transport and extensible markup language (XML) as a data format.

24. A compiler in accordance with claim 18, wherein said web services compatible instructions are compatible with a web services description language (WSDL)-like language.

25. A compiler in accordance with claim 18, wherein said web services compatible instructions are compatible with a simple object oriented protocol (SOAP)-like language.

26. A compiler in accordance with claim 18, wherein said asynchronous transactional messaging language is an XLANG/s-like language.

27. A computer readable storage medium encoded with a computer program code for directing a computer processor to transform instructions in an asynchronous transactional messaging language to instructions compatible with web services, said program code comprising:

a translate proxy class code segment for causing said computer processor to translate proxy class instructions of said asynchronous transactional messaging language into corresponding port type instructions compatible with said web services;

a translate method code segment for causing said computer processor to translate methods of said proxy class instructions into corresponding operations of said port types;

a translate input parameter code segment for causing said computer processor to translate input parameters of said methods into corresponding request message types of said operations;

a translate output parameter code segment for causing said computer processor to translate output parameters of said methods into corresponding response message types of said operations;

a store code segment for causing said computer processor to store the translated output parameters for subsequent use; and a compile code segment for iteratively compiling said port type instructions and said proxy class instructions a predetermined number of times, wherein said predetermined number is determined in accordance with a level of dependency of variables within said asynchronous transactional messaging language.

28. A computer readable medium in accordance with claim 27, wherein said web services compatible instructions are compatible with a remote procedure call protocol.

29. A computer readable medium in accordance with claim 28, wherein said remote procedure call protocol utilizes hypertext transport protocol (HTTP) as a transport and extensible markup language (XML) as a data format.

30. A computer readable medium in accordance with claim 27, wherein said web services compatible instructions are compatible with a web services description language (WSDL).

31. A computer readable medium in accordance with claim 27, wherein said web services compatible instructions are compatible with a simple object oriented protocol (SOAP).

32. A computer readable medium in accordance with claim 27, wherein said asynchronous transactional messaging is XLANG/s.

33. A computer readable medium in accordance with claim 27, further comprising:

an extract class code segment for causing said computer processor to extract a fully qualified class name from a name space of said proxy class;

an append port type class code segment for causing said computer processor to append a prefix to said fully qualified class name, said prefix comprising double underscores followed by a term "porttype" followed by a single underscore; and a first replace code segment for causing said computer processor to replace all periods in said fully qualified class name with a single underscore.

34. A computer readable medium in accordance with claim 27, further comprising:

an extract method code segment for causing said computer processor to extract a fully qualified method name from a name space of said method;

an append message type code segment for causing said computer processor to append a prefix to said fully qualified method name, said prefix comprising double underscores followed by a term "messagetype" followed by a single underscore;

an append suffix code segment for causing said computer processor to appending a suffix to said fully qualified method name, wherein:

if said method comprises an input parameter, said suffix comprises a single underscore followed by a term "request"; and if said method comprises an output parameter, said suffix comprises a single underscore followed by a term "response"; and a second replace code segment for causing said computer processor to replacing all periods in said fully qualified method name with a single underscore.

* * * * *